March 18, 1924.  1,486,931
S. STARK
GAS STOVE
Filed Feb. 12, 1923
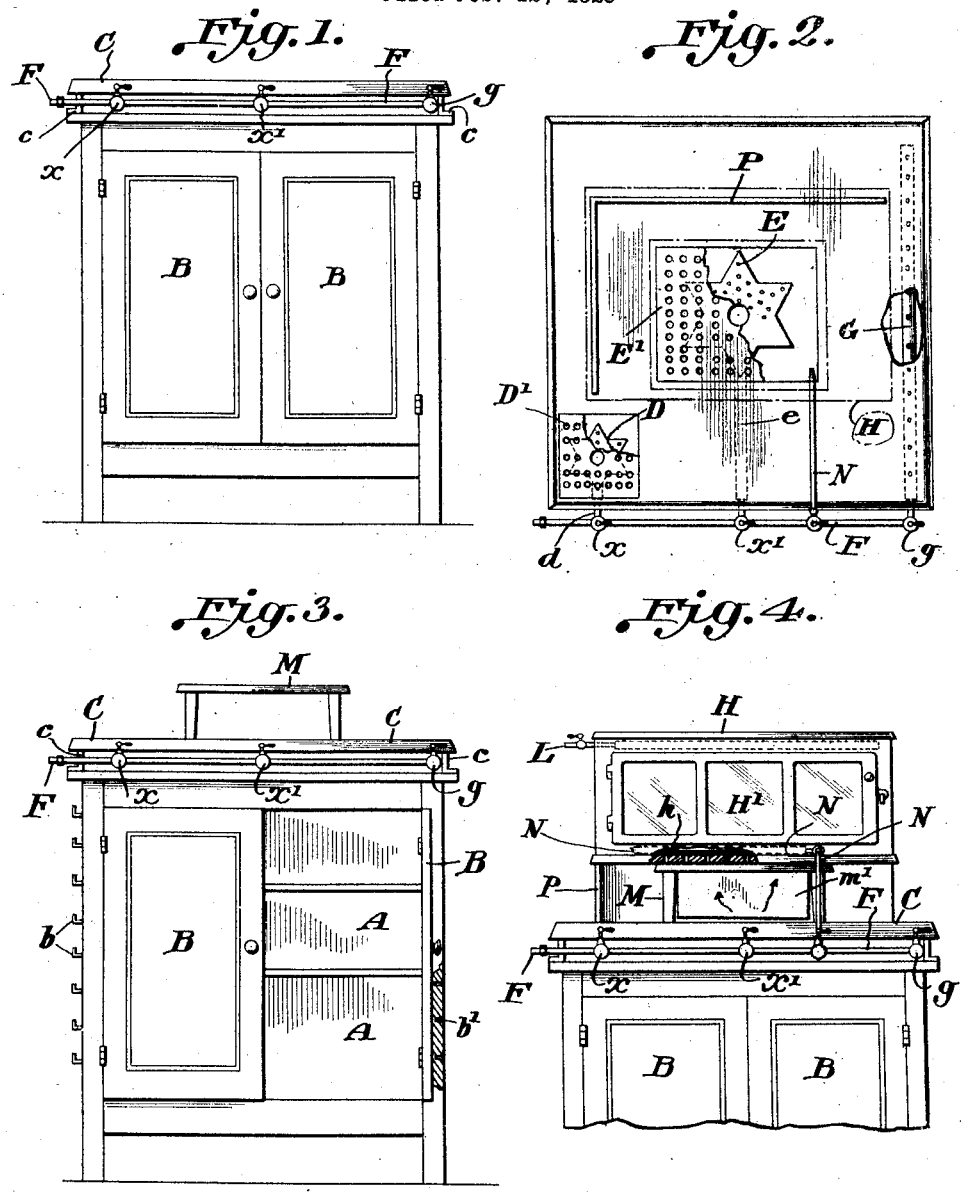
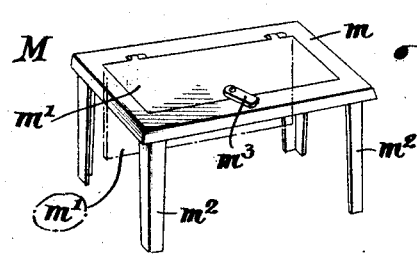
Inventor
Selma Stark
by her Attorneys
Baldwin & Wight Patented Mar. 18, 1924.

1,486,931

UNITED STATES PATENT OFFICE.

SELMA STARK, OF SCRANTON, PENNSYLVANIA.

GAS STOVE.

Application filed February 12, 1923. Serial No. 618,593.

*To all whom it may concern:*

Be it known that I, SELMA STARK, a citizen of the United States, residing at Scranton, in the county of Lackawanna and State of Pennsylvania, have invented certain new and useful Improvements in Gas Stoves, of which the following is a specification.

This invention relates to gas stoves or ranges in which provision is made for cooking various kinds of food, and the object of the invention is to provide means whereby the wasted heat from the burners may be conserved and utilized to the greatest possible extent.

In carrying out my invention I provide a stand for the heating apparatus in the form of a cupboard for the storage of cooking utensils, plates, dishes, food, etc., and on the stand I mount a burner plate provided with gas burners of various sizes and located in different places for different kinds of service. The burner plate is provided with removable sections and suitable valves are employed for regulating the flames in the usual way. One of the burners which is centrally arranged in the burner plate is preferably star shape and is of relatively large dimensions and the plate section over the large burner is perforated and is formed with a relatively large hole in center, so that heat may readily pass from this burner upwardly.

Above the burner plate I support an oven for cooking or heating various kinds of food or for keeping warm various articles. This oven is located directly over the large central burner and it is supported on a shield which partially surrounds the central burner and prevents to a large extent the escape of heat. The oven may be also supported on a stool having a hinged door and provided with a lock for holding it in an elevated position. The bottom of the oven is perforated so that the heat may pass from the centrally arranged burner freely into the oven. I have found that the heat thus passing from the central burner to the oven is sufficient for cooking and baking such foods as cereals and stewing meat and for baking puddings, custards, etc., and other food requiring only a mild heat. The oven is also provided with a burner which may be used for broiling purposes and with another burner which may be used for baking various kinds of food which require strong heat.

In the accompanying drawings:—

Figure 1 is a front elevation of the stand or cabinet with the burner plate supported thereon.

Figure 2 is a plan view of the burner plate showing the arrangement of the pipes and burners and indicating the removable sections and the shield above referred to.

Figure 3 is a view similar to Figure 1 with one of the cupboard doors open showing the shelves and indicating also the stool on which the oven may be supported.

Figure 4 is a view partly in elevation and partly in section showing the doors of the cupboard closed and indicating how the oven is supported on the stool and on the shield.

Figure 5 is a perspective view of the stool.

The stand for the stove consists of a cupboard or cabinet having shelves A and doors B. On the sides it may be provided with hooks $b$ on which cooking utensils may be hung or it may be provided with perforations $b'$ in which the hooks of utensils may be inserted. The burner plate C is held above the top of the cupboard by suitable brackets $c$ and this plate is provided with any desired number of burners D and E supplied by pipes $d$ and $e$ connected to a supply pipe F and provided with valves $x$, $x'$. The burner plate has removable sections D' and E' arranged over the burners D and E and these plates are perforated as shown. The supply pipe F is also connected with a burner G having a valve $g$. The stove thus constructed is intended for cooking or heating various kinds of food.

In order to provide means for cooking more food and for conserving the heat, I provide an oven H having a door H' and a perforated bottom $h$. This oven is also provided with a burner pipe L for broiling purposes and a burner pipe N for baking. Both pipes L and N are provided with valves for regulating the flames.

In order to leave room under the oven to allow food to be cooked over the burner E and for other purposes I provide means for holding the oven at an elevation above the burner plate. This means consist of a stool M comprising a top frame $m$, a door $m'$ and legs $m^2$. The door $m'$ is hinged to the frame $m$ and it is normally held elevated by a turn button $m^3$. When the burner E is in operation, cooking utensils may be placed over it and the heat rising from the burner and the food being cooked will pass through the bottom of the oven and into the oven itself, and I have found that this heat is sufficient to cook food without using the burners L or N, which latter need only be used when high heat is necessary.

In order to prevent the escape of heat I provide a shield P which is arranged under the oven H and partially surrounds it. In Figure 2 the oven is indicated by dash lines at H, while the shield is indicated at P. As shown in Figure 2 the shield surrounds two sides of the burner E, thus preventing to a large extent the escape of heat. The other two sides are left open in order that vessels may be conveniently placed under the burner E beneath the oven. Actual use has shown that by employing such a shield and constructing the parts in the manner indicated, much heat may be conserved and utilized. It will, of course, be understood that when most heat is desired, the door m' of the stool is lowered as shown in Figure 4 and in dotted lines in Figure 5. When the door m' is raised, heat is prevented from passing into the oven but is still conserved by the shield P.

The central burner E is of such large dimensions that several pots or other utensils may be placed around it so that a large quantity of food can be cooked at the same time and furthermore the necessity of using a large number of separate burners is avoided.

I claim as my invention:

1. A gas stove comprising a burner plate provided with a centrally arranged burner of large dimensions and with other burners for general use, an oven having a perforated bottom, a stool resting on the burner plate and supporting the oven, and a hinged door for the stool.

2. The combination with a cupboard having shelves for the storage of food and utensils and provided on the outside with means for suspending utensils, of a burner plate having a centrally arranged burner, an oven having a perforated bottom, a shield partially surrounding the burner, and a stool on which the oven rests and which has a hinged door.

3. A gas stove having a burner plate provided with a centrally arranged burner, an oven having a perforated bottom, a stool arranged under the perforated bottom for holding the oven in place above the burner, and a door carried by the stool opening downward for closing the perforations in the oven.

In testimony whereof, I have hereunto subscribed my name.

SELMA STARK.